United States Patent
Hung

(10) Patent No.: US 10,125,806 B2
(45) Date of Patent: Nov. 13, 2018

(54) SLOTTED SET SCREW STRUCTURE

(71) Applicant: Kuo-Chen Hung, Kaohsiung (TW)

(72) Inventor: Kuo-Chen Hung, Kaohsiung (TW)

(73) Assignee: Ching Zhun Fasteners Company Limited, Kaohsiung (TW)

(*) Notice: Subject to any disclaimer, the term of this patent is extended or adjusted under 35 U.S.C. 154(b) by 216 days.

(21) Appl. No.: 14/947,028

(22) Filed: Nov. 20, 2015

(65) Prior Publication Data
US 2017/0146047 A1 May 25, 2017

(51) Int. Cl.
F16B 35/06 (2006.01)
F16B 35/00 (2006.01)
F16B 23/00 (2006.01)

(52) U.S. Cl.
CPC ........ F16B 35/005 (2013.01); F16B 23/0015 (2013.01); F16B 23/0092 (2013.01)

(58) Field of Classification Search
CPC .. F16B 35/005; F16B 35/007; F16B 23/0007; F16B 23/0015
USPC .......................................... 411/393, 403, 405
See application file for complete search history.

(56) References Cited

U.S. PATENT DOCUMENTS

| | | | | | |
|---|---|---|---|---|---|
| 1,269,971 | A | * | 6/1918 | Smith | F16B 35/005 411/393 |
| 2,877,681 | A | * | 3/1959 | Brown | F16B 27/00 411/393 |
| 3,415,154 | A | * | 12/1968 | Skierski | F16B 23/0076 411/403 |
| 3,470,786 | A | * | 10/1969 | Martins | B25B 13/02 411/405 |
| 4,130,152 | A | * | 12/1978 | Bolen | B25B 15/007 81/451 |
| 6,220,805 | B1 | * | 4/2001 | Chang | B21K 1/44 411/393 |
| 7,013,767 | B1 | * | 3/2006 | Seim | B25B 15/007 411/919 |
| 7,883,308 | B2 | | 2/2011 | Hung | |
| 7,918,693 | B2 | * | 4/2011 | Thomas | F16B 35/005 439/797 |

* cited by examiner

*Primary Examiner* — Flemming Saether
(74) *Attorney, Agent, or Firm* — Alan D. Kamrath; Kamrath IP Lawfirm, P.A.

(57) ABSTRACT

A slotted set screw includes a shank, a slot, a cut metal waste storing recess and an outer thread portion. The slot is provided at an end of the shank and includes an opening and a slot bottom surface. The cut metal waste storing recess is provided on the opening of the slot and includes a first vertical wall, a second vertical wall and a horizontal bottom surface. A first horizontal bottom edge connects between the first vertical wall and the horizontal bottom surface while a second horizontal bottom edge connects between the second vertical wall and the horizontal bottom surface. An included angle is formed between the first horizontal bottom edge or the second horizontal bottom edge and a longitudinal axis of the slot less than a right angle. In an embodiment, the bottom surface is lower than a level of the slot bottom surface in a vertical direction.

5 Claims, 9 Drawing Sheets

SLOTTED SET SCREW STRUCTURE

BACKGROUND OF THE INVENTION

1. Field of the Invention

The present invention relates to a slotted set screw structure. Particularly, the present invention relates to the slotted set screw structure formed with various slot types.

2. Description of the Related Art

U.S. Pat. No. 7,883,308, entitled "SLOTTED SET SCREW," discloses a conventional slotted set screw, as shown in FIG. 1, including a slot provided on an upper end surface and a first cut metal waste storing recess formed at each of two end portions of the slot. The first cut metal waste storing recess has two vertically cutting side walls and a tapered cutting bottom surface to form an enlarged opening. Formed between each of the vertically cutting side walls and the tapered cutting bottom surface is an inclined bottom edge line, identified as "A", extending from the slot to an outer thread portion.

With continued reference to FIG. 1, however, in a forming process of the enlarged opening of the slot on the outer thread portion, formations of the two vertically cutting side walls, the tapered cutting bottom surface and the two inclined bottom edge lines "A" of the first cut metal waste storing recesses with respect to the outer thread portion inevitably result in great complexity of the entire screw-manufacturing process.

In addition, the tapered cutting bottom surface extends downward from a bottom surface of the slot such that a lower section of the enlarged opening expands downward on the outer thread portion with respect to the outer thread portion. Disadvantageously, the lower section of the enlarged opening results in an increase of the lower-section cut metal waste unexpectedly moving along the tapered cutting bottom surface to enter the first cut metal waste storing recess and the slot.

Furthermore, U.S. Pat. No. 7,883,308 discloses another conventional slotted set screw, as shown in FIG. 2, including a slot provided on an upper end surface and a second straight-line cut metal waste storing recess formed at each of two end portions of the slot on an outer thread portion. Each second cut metal waste storing recess has an extra enlarged straight-line cutting portion in comparing with the first cut metal waste storing recess, as shown in FIG. 1.

Referring again to FIG. 2, each second cut metal waste storing recess is formed with a vertically straight-line cutting wall intersecting with the slot generally perpendicular to the diametric direction and extending from an upper end towards but spaced from a lower end to the outer thread portion at circumferentially spaced locations on a cylindrical outer surface. Each second cut metal waste storing recess is further formed with a flat cutting bottom wall extending from the vertically straight-line cutting wall to the outer thread portion and is spaced from the upper end and the lower end.

With continued reference to FIG. 2, two end edges of the vertically straight-line cutting wall of each second cut metal waste storing recess connect straight through between two cut ends of threads whose remained circumferences are exceedingly shortened for a thread-screwing operation. Disadvantageously, formation of the two vertically straight cutting walls on an upper end of the slotted set screw results in weakening the entire structural strength the upper end (i.e., head portion) and the threads thereof.

However, there is a need of providing a longer circumference of the threads to strengthen the upper end portion (i.e., head portion) of the slotted set screw and also providing enlarged dimensions of each cut metal waste storing recess. The above-mentioned patent is incorporated herein by reference for purposes including, but not limited to, indicating the background of the present invention and illustrating the situation of the art.

As is described in greater detail below, the present invention provides a slotted set screw structure. A cut metal waste storing recess is formed with two vertical walls (or inclined walls) and a horizontal bottom surface on an upper end portion or a lower end portion of the slotted set screw. A horizontal bottom edge is formed between each of the two vertical walls (or inclined walls) and the horizontal bottom surface to reduce an amount of cutting dimensions of the upper end portion or the lower end portion in such a way as to strengthen the entire structure of the upper end portion or the lower end portion of the slotted set screw and the threads thereof.

SUMMARY OF THE INVENTION

The primary objective of this invention is to provide a slotted set screw structure. A cut metal waste storing recess is formed with two vertical walls (or inclined walls) and a horizontal bottom surface on an upper end portion or a lower end portion of the slotted set screw. A horizontal bottom edge is formed between each of the two vertical walls (or inclined walls) and the horizontal bottom surface to reduce an amount of cutting dimensions of the upper end portion or the lower end portion. Advantageously, the slotted set screw of the present invention is successful in strengthening the entire structure of the upper end portion or the lower end portion of the slotted set screw and the threads thereof.

The slotted set screw structure in accordance with an aspect of the present invention includes:

a shank including a first end portion, a second end portion and a cylindrical outer surface provided between the first end portion and the second end portion;

at least one slot provided on at least one of the first end portion and the second end portion; with the slot having a bottom surface, a first opening and a second opening, with the slot extending along a longitudinal axis;

at least one cut metal waste storing recess formed on at least one of the first opening and the second opening of the slot, with the cut metal waste storing recess formed with a first vertical wall, a second vertical wall and a horizontal bottom surface; and an outer thread portion formed on the cylindrical outer surface;

with a first horizontal bottom edge formed between the first vertical wall and the horizontal bottom surface, with the first horizontal bottom edge parallel to the bottom surface of the slot, and with a first included angle formed between the first horizontal bottom edge and the longitudinal axis of the slot being less than a right angle; and with a second horizontal bottom edge formed between the second vertical wall and the horizontal bottom surface, with the second horizontal bottom edge parallel to the bottom surface of the slot, and with a second included angle formed between the second horizontal bottom edge and the longitudinal axis of the slot being less than a right angle.

In a separate aspect of the present invention, the first vertical wall and the second vertical wall extend along circular edge lines of the first horizontal bottom edge and the second horizontal bottom edge to form a first circularly-bent vertical wall and a second circularly-bent vertical wall.

In a further separate aspect of the present invention, the first vertical wall and the second vertical wall extend along oval-shaped sectional edge lines of the first horizontal bottom edge and the second horizontal bottom edge to form a first oval-shaped bent vertical wall and a second oval-shaped bent vertical wall.

The slotted set screw structure in accordance with an aspect of the present invention includes:

a shank including a first end portion, a second end portion and a cylindrical outer surface provided between the first end portion and the second end portion;

at least one slot provided on at least one of the first end portion and the second end portion, with the slot having a bottom surface, a first opening and a second opening, with the slot extending along a longitudinal axis;

at least one cut metal waste storing recess formed on at least one of the first opening and the second opening of the slot, with the cut metal waste storing recess formed with a first spiral-twisted curved wall, a second spiral-twisted curved wall and a horizontal bottom surface; and an outer thread portion formed on the cylindrical outer surface;

with a first horizontal bottom edge formed between the first spiral-twisted curved wall and the horizontal bottom surface, with the first horizontal bottom edge parallel to the bottom surface of the slot, and with a first included angle formed between the first horizontal bottom edge and the longitudinal axis of the slot being less than a right angle; and with a second horizontal bottom edge formed between the second spiral-twisted curved wall and the horizontal bottom surface, with the second horizontal bottom edge parallel to the bottom surface of the slot, and with a second included angle formed between the second horizontal bottom edge and the longitudinal axis of the slot being less than a right angle.

In a separate aspect of the present invention, the first spiral-twisted curved wall and the second spiral-twisted curved wall have a first outer slant edge and a second outer slant edge connecting with the outer thread portion.

In a further separate aspect of the present invention, the first outer slant edge and the second outer slant edge define an end opening having a widened width at a top portion thereof and a narrowed width at a bottom portion thereof.

In yet a further separate aspect of the present invention, the slot further combines with an additional slot type to form a complex slot.

The slotted set screw structure in accordance with an aspect of the present invention includes:

a shank including a first end portion, a second end portion and a cylindrical outer surface provided between the first end portion and the second end portion;

at least one slot provided on at least one of the first end portion and the second end portion, with the slot having a bottom surface, a first opening and a second opening, with the slot extending along a longitudinal axis;

at least one cut metal waste storing recess formed on at least one of the first opening and the second opening of the slot, with the cut metal waste storing recess formed with a first vertical wall, a second vertical wall and a storing bottom surface, with the storing bottom surface having an inner end edge; and an outer thread portion formed on the cylindrical outer surface;

with the inner end edge of the storing bottom surface having a predetermined vertical height lower than the bottom surface of the slot to form a stepped portion for spacing apart each other.

In a separate aspect of the present invention, the storing bottom surface is formed from a horizontal bottom surface.

In a further separate aspect of the present invention, the first vertical wall and the second vertical wall are formed from a vertical flat wall, a vertical bent wall, an inclined wall or a spiral-twisted curved wall.

In yet a further separate aspect of the present invention, the spiral-twisted curved wall of the first vertical wall or the second vertical wall has a first outer slant edge or a second outer slant edge connecting with the outer thread portion.

In yet a further separate aspect of the present invention, the first outer slant edge and the second outer slant edge define an end opening having a widened width at a top portion thereof and a narrowed width at a bottom portion thereof.

In yet a further separate aspect of the present invention, the first vertical wall and the second vertical wall extend downward beyond a level of the bottom surface of the slot.

In yet a further separate aspect of the present invention, the storing bottom surface extends into the bottom surface located between two side walls of the slot.

In yet a further separate aspect of the present invention, the storing bottom surface is a curved bottom surface for guiding cut metal waste to fall off from the cut metal waste storing recess.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a slotted set screw structure in accordance with the preferred embodiments of the present invention can be applicable to various slotted set screws, such as stud bolts for example. The manufacturing method of the slotted set screw in accordance with the preferred embodiments of the present invention can be applicable to various international standards, including ISO (International Organization for Standardization), ANSI (American National Standards Institute), JIS (Japanese Industrial Standards), DIN (German National Standards), BSW (British Standard Whitworth), etc., which are not limitative of the present invention.

Further, the slotted set screw in accordance with the preferred embodiments of the present invention is made of various complex materials, metals or metal alloys, including magnesium, magnesium alloy, aluminum, aluminum alloy, stainless steel, low-carbon steel (mild steel), medium carbon steel, alloy steel, bronze, other metal (e.g., nonferrous metals) and a metal alloy, for example.

Figure 1:
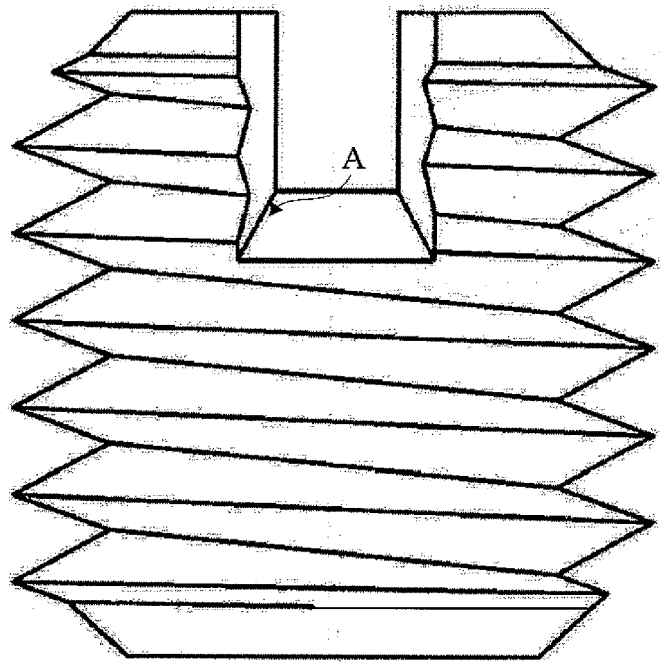
FIG. 1 is a side view of a conventional slotted set screw in accordance with the prior art.
Figure 2:
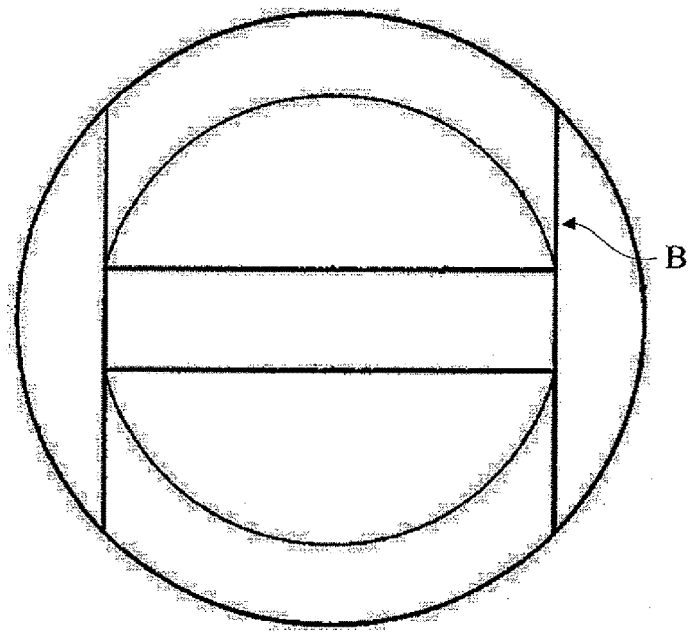
FIG. 2 is a top view of another conventional slotted set screw in accordance with the prior art.
Figure 3:
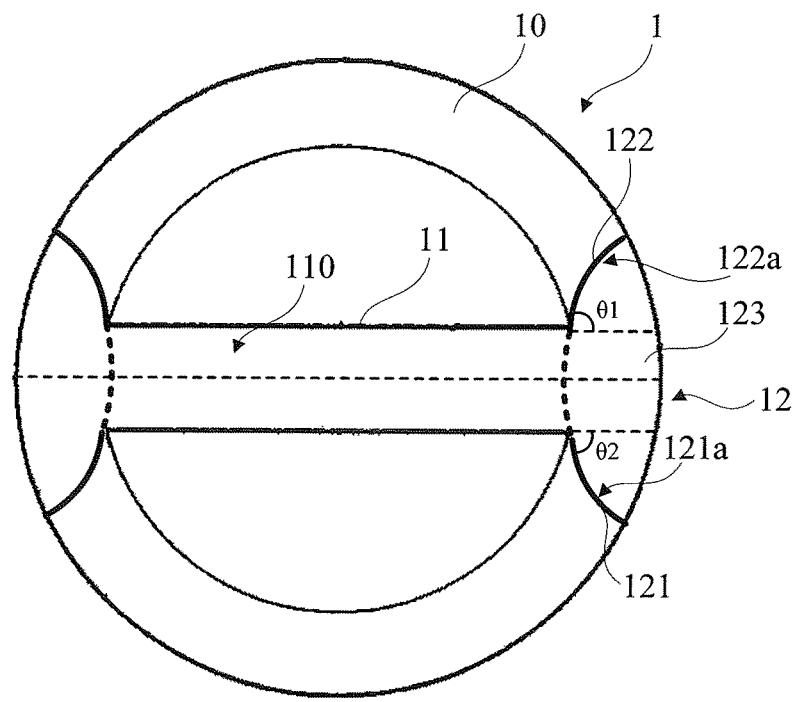
FIG. 3 is a top view of a slotted set screw in accordance with a first preferred embodiment of the present invention.
Figure 4:
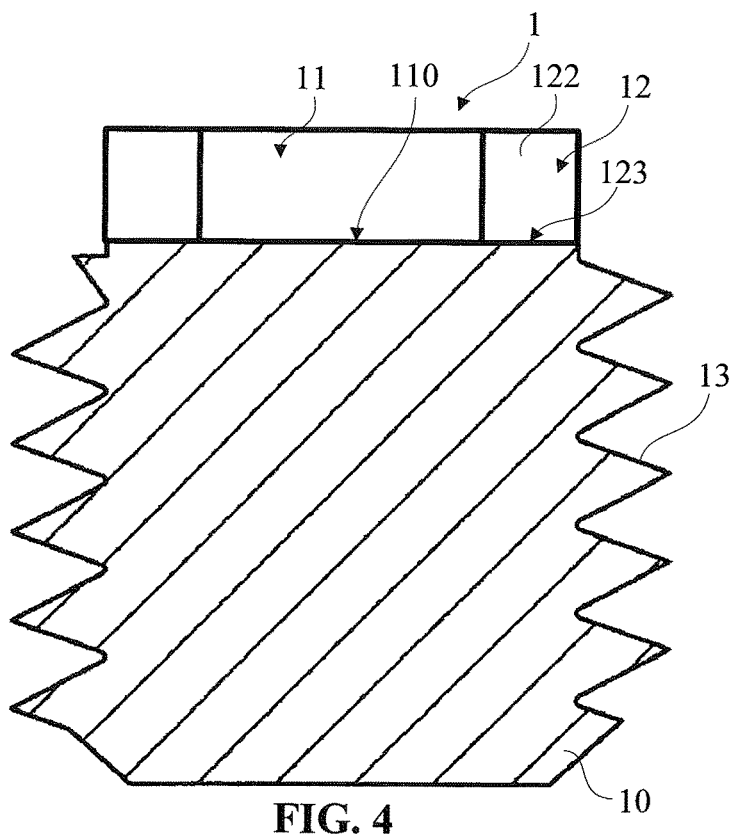
FIG. 4 is a cross-sectional view of a similar slotted set screw in accordance with the first preferred embodiment of the present invention.
Figure 5:
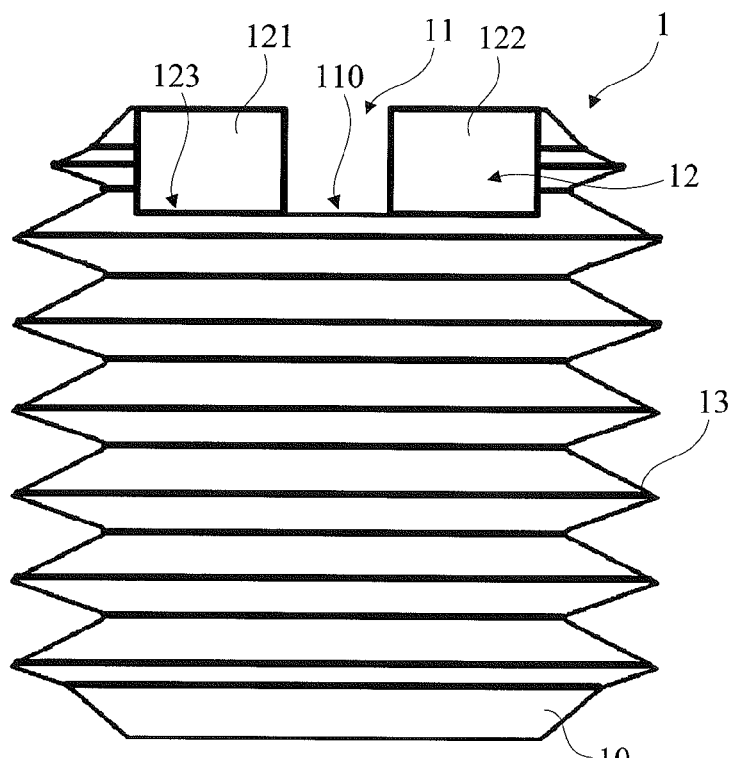
FIG. 5 is a side view of a similar slotted set screw in accordance with the first preferred embodiment of the present invention.

FIGS. 3-5 show top, cross-sectional and side views of similar slotted set screws in accordance with a first preferred embodiment of the present invention. Referring to FIGS. 3-5, the slotted set screw 1 in accordance with the first preferred embodiment of the present invention includes a bolt shank 10, at least one slot 11, two cut metal waste storing recesses 12 and an outer thread portion 13.

With continued reference to FIGS. 3-5, by way of example, the bolt shank 10 includes a first end portion, a second end portion and a cylindrical outer surface. The first end portion and the second end portion are provided at opposite ends (i.e., upper end and lower end) of the bolt shank 10. The cylindrical outer surface is provided between the first end portion and the second end portion. The outer thread portion 13 is formed on the cylindrical outer surface by a thread-rolling procedure.

Referring again to FIGS. 4 and 5, by way of example, a thread type of the outer thread portion 13 formed on the cylindrical outer surface of the bolt shank 10 is a single thread, a double thread, a high-low thread, a tri-lobular thread or other thread shape, which are not limitative of the present invention.

Referring back to FIGS. 3-5, the slot 11 is selectively provided on one of the first end portion and the second end portion. The slot 11 has a first opening, a second opening, a first side wall, a second side wall and a bottom surface (i.e., slot bottom surface) 110. The first side wall, the second side wall and the bottom surface 110 of the slot 11 extend along a longitudinal axis, as best shown at dotted line in FIG. 3, between the first opening and the second opening.

With continued reference to FIGS. 3-5, the cut metal waste storing recess 12 is selectively provided on the first opening, the second opening or both. The cut metal waste storing recess 12 includes a first vertical wall 121, a second vertical wall 122 and a horizontal bottom surface 123. In order to strengthen the structure of the end portion of the bolt shank 10 and to increase lengths of a sectional circumference of the threads, the first vertical wall 121 and the second vertical wall 122 are formed from a bent vertical wall bent to the longitudinal axis of the slot 11. The first vertical wall 121 and the second vertical wall 122 extend along symmetric circular edge lines to form a first circularly-bent vertical wall and a second circularly-bent vertical wall, as best shown at dotted line in FIG. 3. In a preferred embodiment, the first vertical wall 121 and the second vertical wall 122 extend along symmetric oval-shaped sectional edge lines to form a first oval-shaped bent vertical wall and a second oval-shaped bent vertical wall.

With continued reference to FIGS. 3-5, a first horizontal bottom edge 121a is formed between the first vertical wall 121 and the horizontal bottom surface 123 while a second horizontal bottom edge 122a is formed between the second vertical wall 122 and the horizontal bottom surface 123. The first horizontal bottom edge 121a and the second horizontal bottom edge 122a are parallel to the bottom surface 110 of the slot 11 in order to simplify the entire structure. Furthermore, a first included angle θ1 is formed between the first horizontal bottom edge 121a and the longitudinal axis of the slot 11 and is less than a right angle. Correspondingly a second included angle θ2 is formed between the second horizontal bottom edge 122a and the longitudinal axis of the slot 11 and is less than a right angle.

Figure 6:
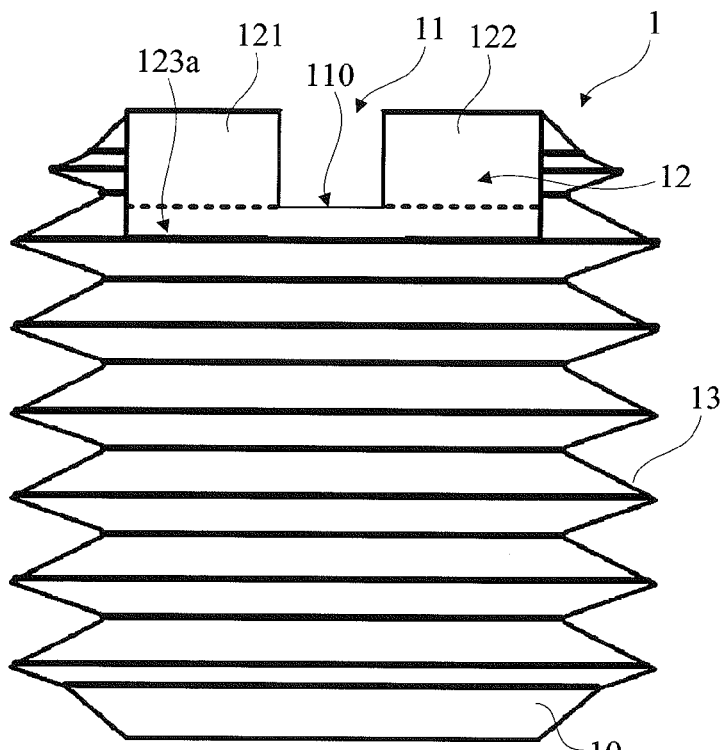
FIG. 6 is a side view of the slotted set screw in accordance with a second preferred embodiment of the present invention.
Figure 7:
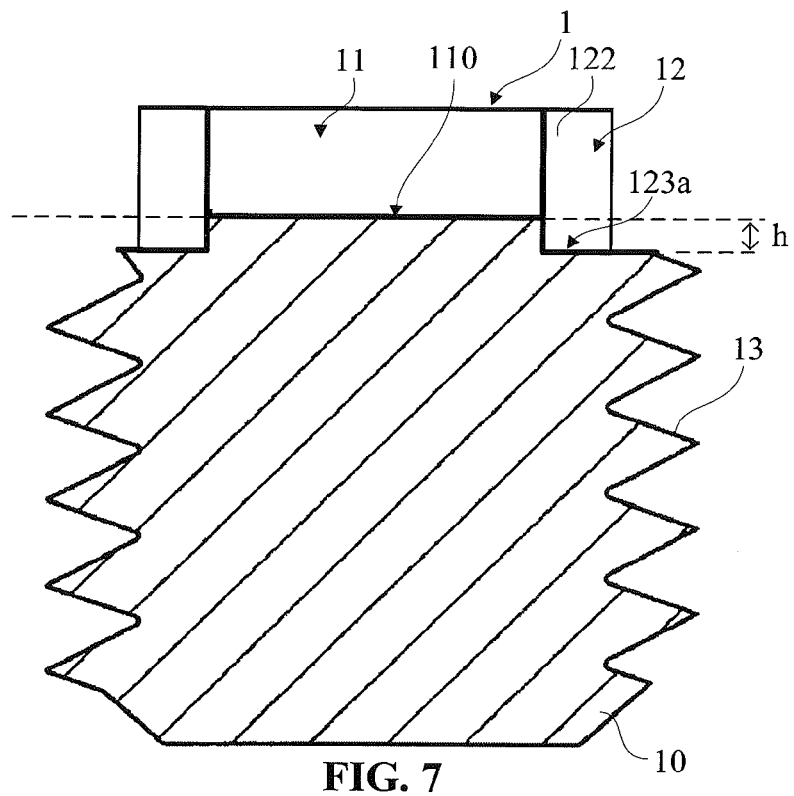
FIG. 7 is a cross-sectional view of the slotted set screw in accordance with the second preferred embodiment of the present invention.

FIGS. 6 and 7 show side and cross-sectional views of the slotted set screw in accordance with a second preferred embodiment of the present invention. Referring to FIGS. 6 and 7, in comparison with the first embodiment, the slotted set screw 1 of the second preferred embodiment has an inner end edge of the horizontal bottom surface (i.e., storing bottom surface) 123a of the cut metal waste storing recess 12 which has a predetermined vertical height, identified as "h," lower than the bottom surface 110 of the slot 11, as best shown at dotted lines in FIGS. 6 and 7, to form a stepped portion for spacing apart each other. Accordingly, the first vertical wall 121 and the second vertical wall 122 extend downward beyond a level of the bottom surface 110 of the slot 11. Advantageously, the stepped portion enlarges an inner space of the cut metal waste storing recess 12 for avoiding cut metal waste becoming stuck therein and blocking the cut metal waste entering the slot 11.

Figure 8:
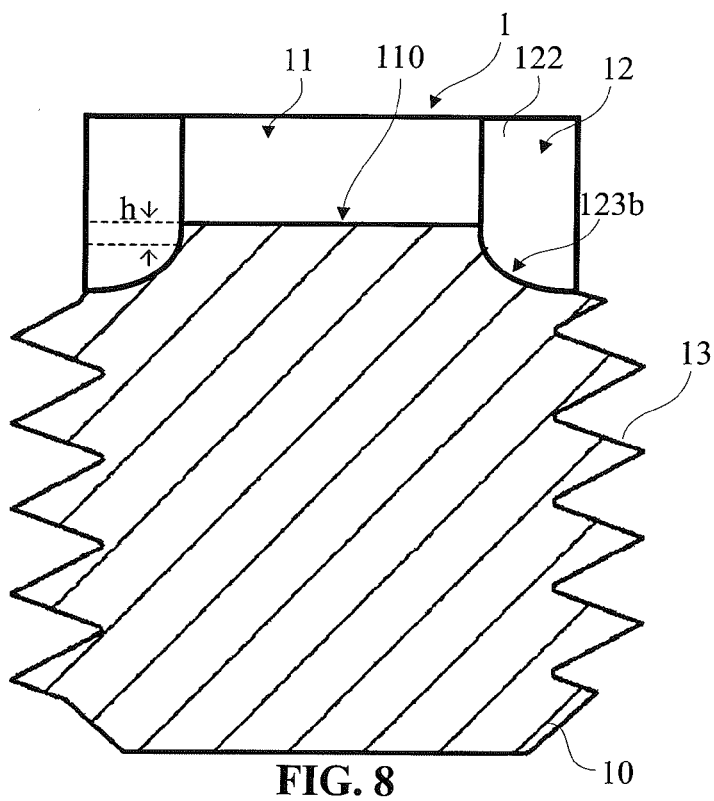
FIG. 8 is a cross-sectional view of the slotted set screw in accordance with a third preferred embodiment of the present invention.

FIG. 8 shows a cross-sectional view of the slotted set screw in accordance with a third preferred embodiment of the present invention. Referring to FIG. 8, in comparison with the second embodiment, the horizontal bottom surface 123b of the third preferred embodiment has a curved bottom surface of the storing bottom surface for guiding cut metal waste to fall off from the cut metal waste storing recess 12.

Figure 9:
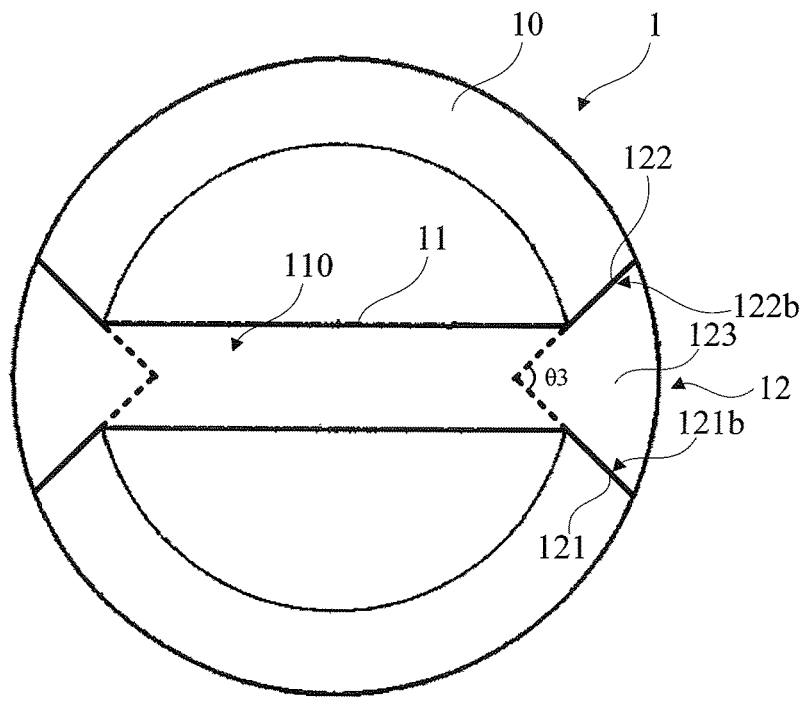
FIG. 9 is a top view of the slotted set screw in accordance with a fourth preferred embodiment of the present invention.
Figure 10:
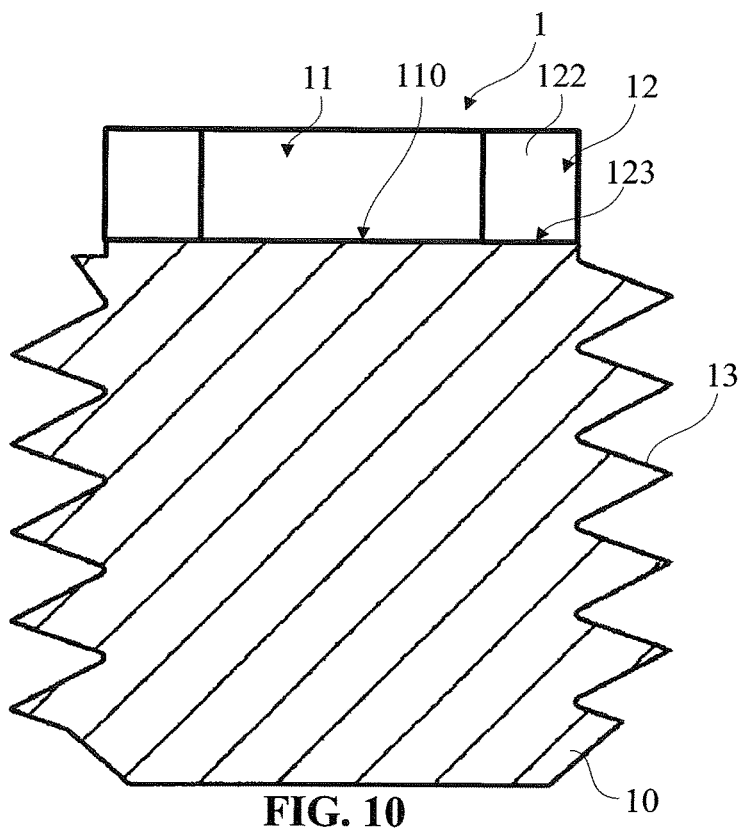
FIG. 10 is a cross-sectional view of a similar slotted set screw in accordance with the fourth preferred embodiment of the present invention.

FIGS. 9 and 10 show top and cross-sectional views of a similar slotted set screw in accordance with a fourth preferred embodiment of the present invention. Referring to FIGS. 9 and 10, in comparison with the first embodiment, the slotted set screw 1 of the fourth preferred embodiment has the first vertical wall 121 and the second vertical wall 122 formed from a vertical flat wall. An included angle θ3 is formed between the first vertical wall 121 and the second vertical wall 122, as shown at dotted lines in FIG. 9.

Figure 11:
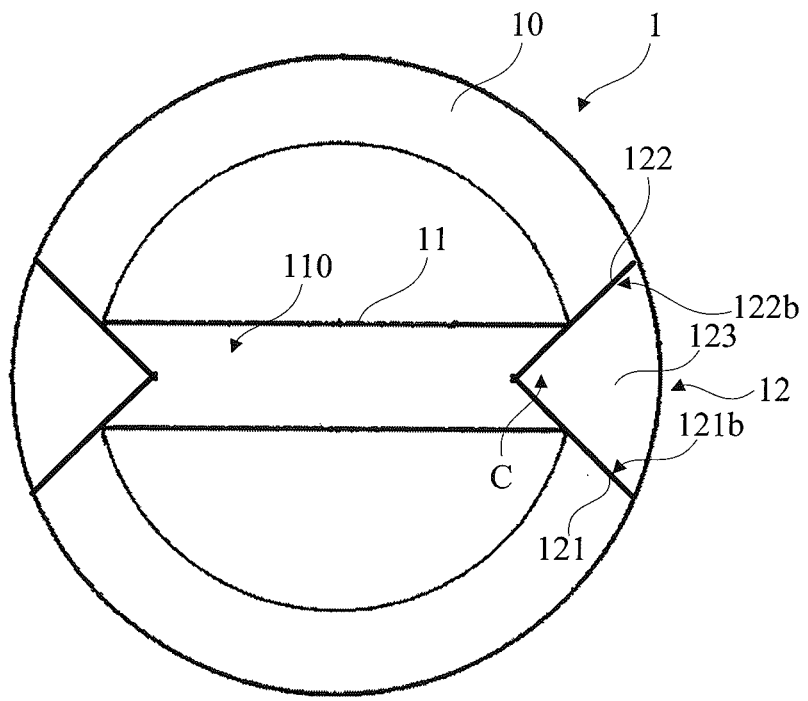
FIG. 11 is a top view of the slotted set screw in accordance with a fifth preferred embodiment of the present invention.
Figure 12:
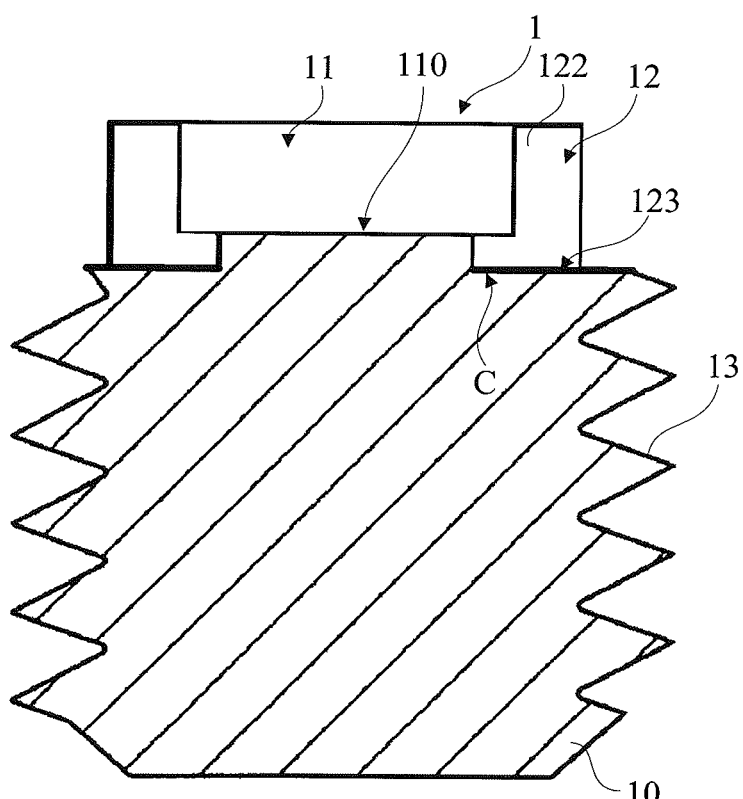
FIG. 12 is a cross-sectional view of a similar slotted set screw in accordance with the fifth preferred embodiment of the present invention.
Figure 13:
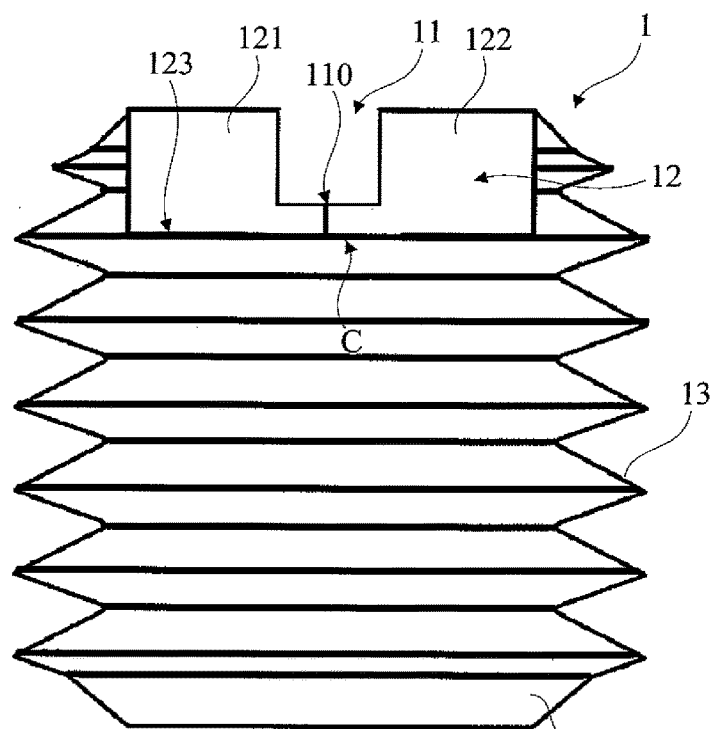
FIG. 13 is a side view of a similar slotted set screw in accordance with the fifth preferred embodiment of the present invention.

FIGS. 11-13 show top, cross-sectional and side views of similar slotted set screws in accordance with a fifth preferred embodiment of the present invention. Referring to FIGS. 11-13, in comparison with the fourth embodiment, the similar slotted set screws 1 of the fifth preferred embodiment have the horizontal bottom surface (i.e., storing bottom surface) 123 formed with an end bottom portion, identified as "C," extending a predetermined distance into the bottom surface 110 located between the two walls of the slot 11. Accordingly, each of the first vertical wall 121 and the second vertical wall 122 has an extended bottom portion with a predetermined distance extending into the slot 11.

FIGS. 11-13 show top, cross-sectional and side views of the slotted set screw in accordance with a fifth preferred embodiment of the present invention. Referring to FIGS. 11-13, in comparison with the fourth embodiment, the similar slotted set screw 1 of the fifth preferred embodiment has the horizontal bottom surface (i.e., storing bottom surface) 123 formed with an end bottom portion, identified as "C," extending a predetermined distance into the bottom surface 110 located between the two walls of the slot 11. Accordingly, each of the first vertical wall 121 and the second vertical wall 122 has an extended bottom portion with a predetermined distance extending into the slot 11.

Figure 14:
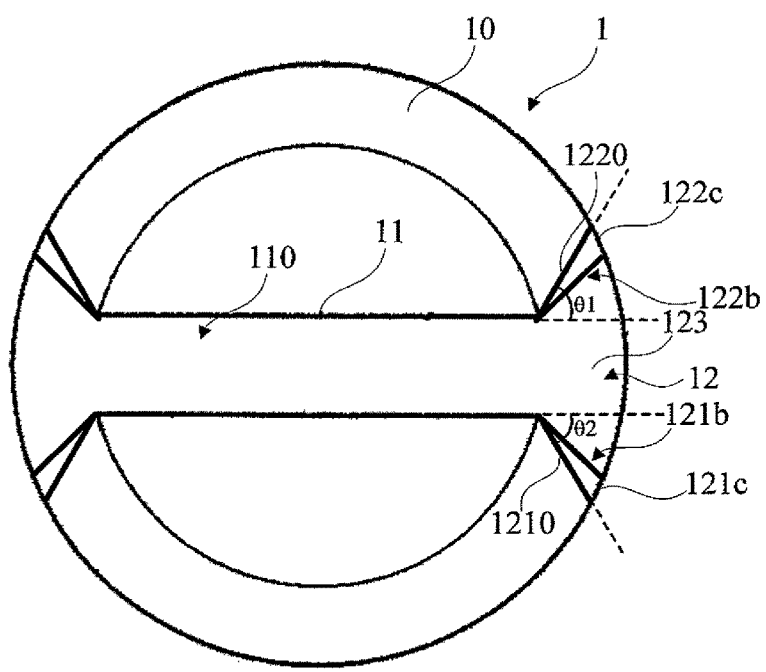
FIG. 14 is a top view of the slotted set screw in accordance with a sixth preferred embodiment of the present invention.
Figure 15:
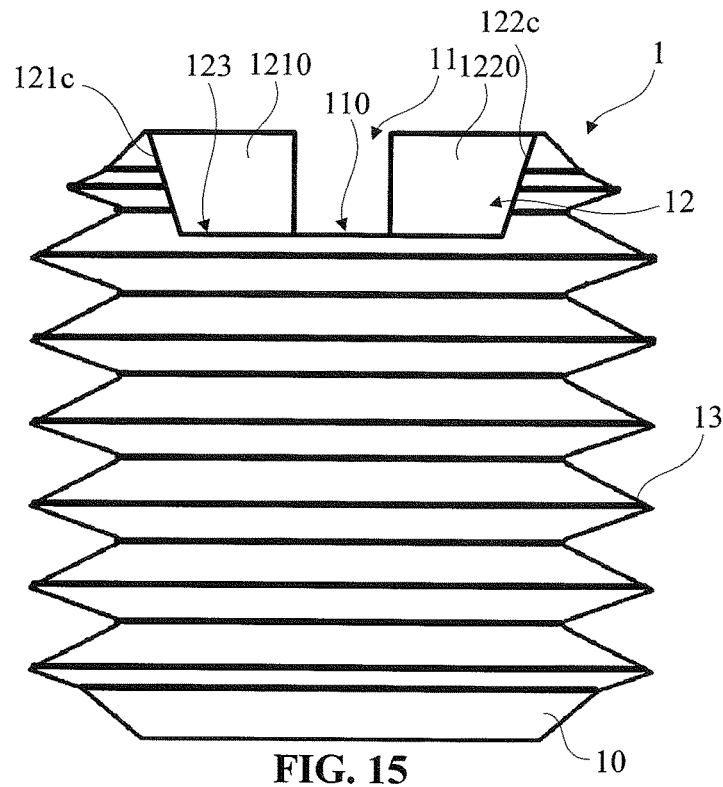
FIG. 15 is a side view of a similar slotted set screw in accordance with the sixth preferred embodiment of the present invention.

FIGS. 14 and 15 show top and side views of the slotted set screw in accordance with a sixth preferred embodiment of the present invention. Referring to FIGS. 14 and 15, in comparison with the first embodiment, the slotted set screw 1 of the sixth preferred embodiment has a first vertical wall 1210 and a second vertical wall 1220 formed from a first spiral-twisted curved wall and a second spiral-twisted curved wall. The first spiral-twisted curved wall has a first outer slant edge 121c while the second spiral-twisted curved wall has a second outer slant edge 122c. The first outer slant edge 121c and the second outer slant edge 122c connect with threads of the outer thread portion 13. Furthermore, the first outer slant edge 121c and the second outer slant edge 122c define an end opening having a widened width at a top portion thereof and a narrowed width at a bottom portion thereof.

Figure 16:
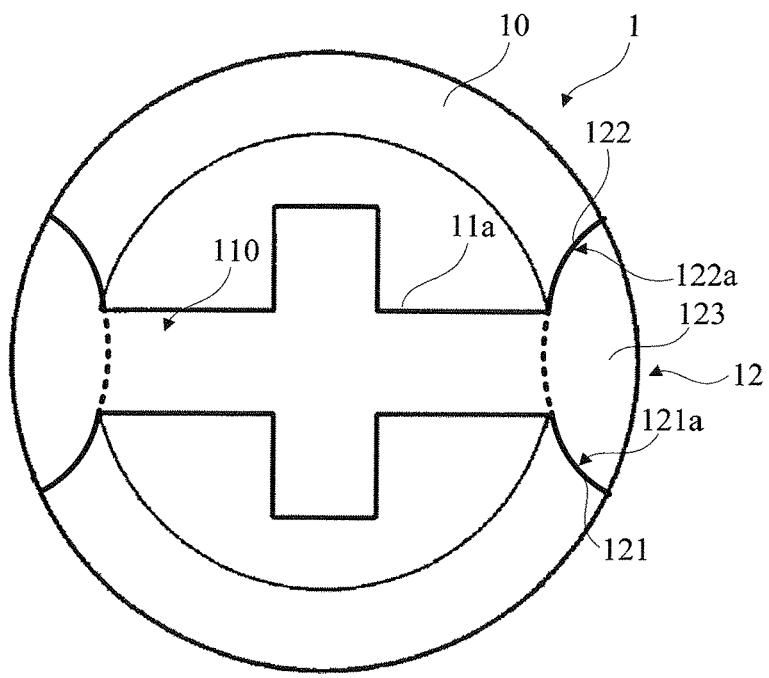
FIG. 16 is a top view of a slotted set screw in accordance with a seventh preferred embodiment of the present invention.

FIG. 16 is a top view of a slotted set screw in accordance with a seventh preferred embodiment of the present invention. Referring to FIG. 16, in comparison with the first embodiment, the slotted set screw 1 of the seventh preferred embodiment has the slot 11 combining with a Phillips recess type to form a first complex slot 11a as a slotted & Phillips combination type.

Figure 17:
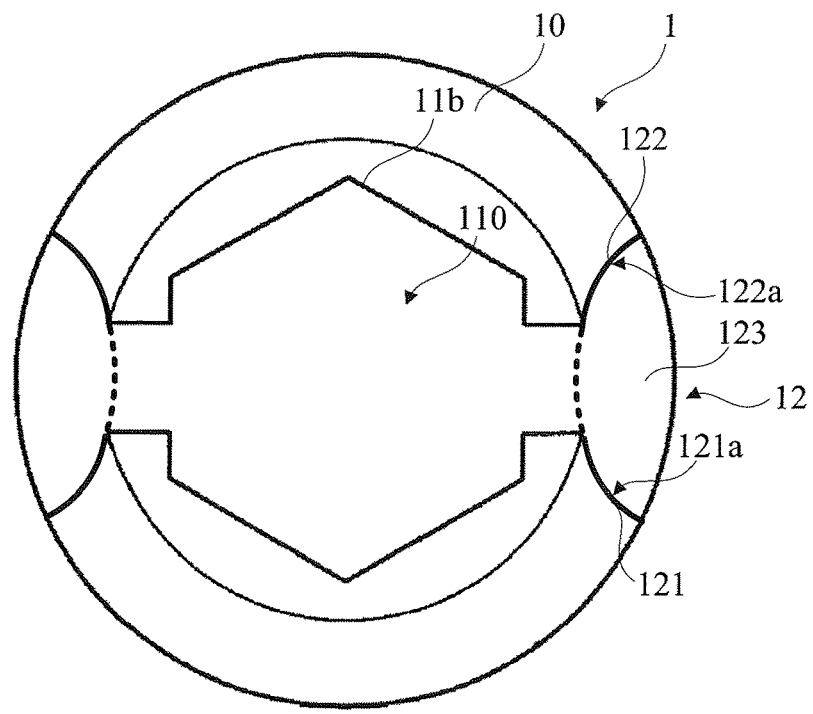
FIG. 17 is a top view of a slotted set screw in accordance with an eighth preferred embodiment of the present invention.

FIG. 17 is a top view of a slotted set screw in accordance with an eighth preferred embodiment of the present invention. Referring to FIG. 17, in comparison with the first embodiment, the slotted set screw 1 of the eighth preferred embodiment has the slot 11 combining with a hexagon type to form a second complex slot 11b as a slotted & hexagon combination type.

Figure 18:
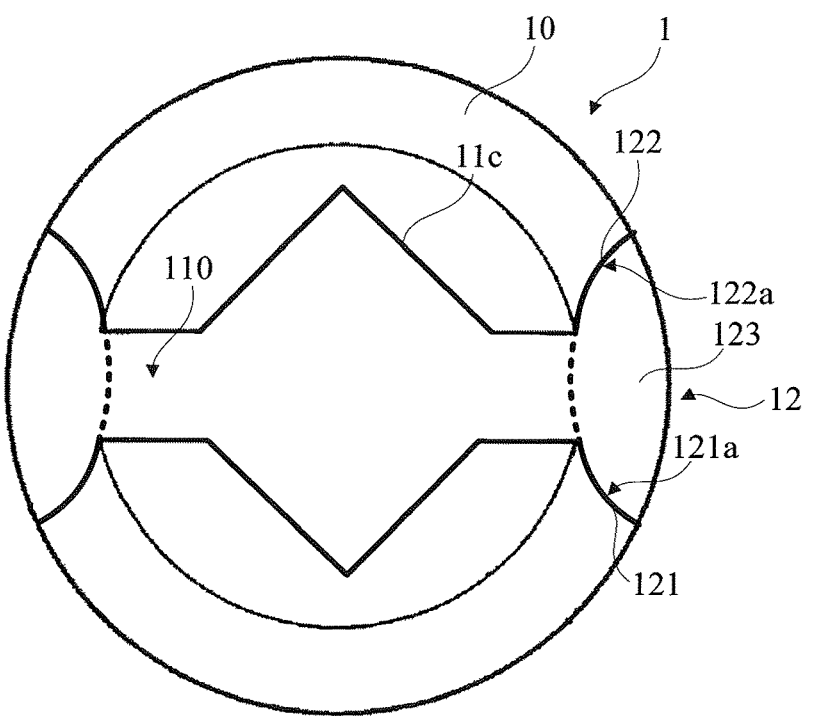
FIG. 18 is a top view of a slotted set screw in accordance with a ninth preferred embodiment of the present invention.

FIG. 18 is a top view of a slotted set screw in accordance with a ninth preferred embodiment of the present invention. Referring to FIG. 18, in comparison with the first embodiment, the slotted set screw 1 of the ninth preferred embodiment has the slot 11 combining with a square type to form a third complex slot 11c as a slotted & square combination type.

By way of example, the first, second and third complex slots 11a, 11b, 11c can be further embodied with an additional type which is a plane hexagon type, a H type, a TX tamper resistant type, a TX type or a PZ drive type, which are not limitative of the present invention.

Although the invention has been described in detail with reference to its presently preferred embodiments, it will be understood by one of ordinary skills in the art that various modifications can be made without departing from the spirit and the scope of the invention, as set forth in the appended claims.

What is claimed is:

1. A slotted set screw structure comprising:
a shank including a first free end portion, a second free end portion and a cylindrical outer surface extending between the first free end portion and the second free end portion, with the first and second free end portions being spaced from each other along a shank axis;
at least one slot provided on at least one of the first free end portion and the second free end portion, with the at least one slot having a bottom surface, a first opening and a second opening, with the at least one slot extending along a longitudinal axis extending perpendicular to the shank axis, with the at least one slot having a first longitudinal slot wall and a second longitudinal slot wall extending parallel to each other between the first opening and the second opening and along and parallel to the longitudinal axis;
at least one cut metal waste storing recess formed on at least one of the first opening and the second opening of the at least one slot and extending from the cylindrical outer surface of the shank, with the at least one cut metal waste storing recess fowled with a first vertical wall, a second vertical wall and a horizontal bottom surface; and
an outer thread portion formed on the cylindrical outer surface and extending between the first and second free end portions, with the at least one slot provided in the shank at the at least one of the first and second free end portions to form a headless screw;
wherein a first horizontal bottom edge is formed between the first vertical wall and the horizontal bottom surface and the first horizontal bottom edge is parallel to the bottom surface of the slot, with a first included angle formed between the first horizontal bottom edge and a line parallel to the longitudinal axis of the slot being less than a right angle; and
wherein a second horizontal bottom edge is formed between the second vertical wall and the horizontal bottom surface and the second horizontal bottom edge is parallel to the bottom surface of the slot, with a second included angle formed between the second horizontal bottom edge and a line parallel to the longitudinal axis of the slot being less than the right angle.

2. The slotted set screw structure as defined in claim 1, wherein the first vertical wall and the second vertical wall extend along circular edge lines of the first horizontal bottom edge and the second horizontal bottom edge to form a first circularly-bent vertical wall and a second circularly-bent vertical wall.

3. The slotted set screw structure as defined in claim 1, wherein the first vertical wall and the second vertical wall extend along oval-shaped sectional edge lines of the first horizontal bottom edge and the second horizontal bottom edge to form a first oval-shaped bent vertical wall and a second oval-shaped bent vertical wall.

4. The slotted set screw structure as defined in claim 1, wherein the first vertical wall and the second vertical wall are formed from a bent vertical wall bent to the longitudinal axis of the slot.

5. The slotted set screw structure as defined in claim 1, wherein the slot further combines with an additional slot to form a complex slot.

\* \* \* \* \*